US010121312B2

(12) United States Patent
Allen et al.

(10) Patent No.: US 10,121,312 B2
(45) **Date of Patent: *Nov. 6, 2018**

(54) MOBILE DEVICE APPLICATIONS FOR CASINOS

(71) Applicant: Bally Gaming, Inc., Las Vegas, NV (US)

(72) Inventors: Jeffrey L. Allen, Naperville, IL (US); Scott A. Massing, Lincolnwood, IL (US); Brian P. Moyles, La Grange, IL (US); Larry J. Pacey, Northbrook, IL (US); Matthew J. Ward, Northbrook, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/228,224

(22) Filed: Aug. 4, 2016

(65) Prior Publication Data

US 2016/0343194 A1 Nov. 24, 2016

Related U.S. Application Data

(63) Continuation of application No. 14/112,231, filed as application No. PCT/US2012/034066 on Apr. 18, 2012, now Pat. No. 9,472,049.

(Continued)

(51) Int. Cl.
*G06F 17/00* (2006.01)
*G07F 17/32* (2006.01)

(52) U.S. Cl.
CPC ........ *G07F 17/323* (2013.01); *G07F 17/3241* (2013.01); *G07F 17/3288* (2013.01)

(58) Field of Classification Search
CPC ........................... G07F 17/323; G07F 17/3288
See application file for complete search history.

(56) References Cited

U.S. PATENT DOCUMENTS

| | | | | |
|---|---|---|---|---|
| 9,472,049 | B2 * | 10/2016 | Allen | G07F 17/3288 |
| 2002/0128057 | A1 | 9/2002 | Walker et al. | |

(Continued)

FOREIGN PATENT DOCUMENTS

| | | |
|---|---|---|
| WO | 2010057057 | 5/2010 |
| WO | 2012145393 | 10/2012 |

OTHER PUBLICATIONS

"PCT Application No. PCT/US12/34066 International Preliminary Report on Patentability", dated Jun. 10, 2013, 9 pages.

(Continued)

*Primary Examiner* — Reginald Renwick
(74) *Attorney, Agent, or Firm* — Marvin A. Hein

(57) ABSTRACT

A wagering game system configured to perform operations to transmit to a mobile device, via a wireless communication device of the gaming system, an offer for presentation via the mobile device in response to detecting that the mobile device is located at a casino. The offer is associated with a wagering game machine within the casino. The operations can further include detecting, via an electronic tracking device associated with the wagering game machine, an electronic identifier provided from the mobile device. For instance, the mobile device can provide the electronic identifier to the wagering game machine. The operations can further include associating, via an electronic processing unit of the gaming system, the offer with the wagering game machine in response to detecting the electronic identifier.

20 Claims, 8 Drawing Sheets

Related U.S. Application Data

(60) Provisional application No. 61/476,618, filed on Apr. 18, 2011.

(56) References Cited

U.S. PATENT DOCUMENTS

| | | | |
|---|---|---|---|
| 2011/0059800 | A1 | 3/2011 | Anderson et al. |
| 2014/0045586 | A1 | 2/2014 | Allen et al. |

OTHER PUBLICATIONS

"PCT Application No. PCT/US12/34066 International Search Report", dated Jul. 5, 2012, 10 pages.
"U.S. Appl. No. 14/112,231 Office Action", dated Nov. 19, 2015, 22 Pages.

* cited by examiner

MOBILE DEVICE APPLICATIONS FOR CASINOS

RELATED APPLICATIONS

This application is a continuation of, and claims priority benefit of, U.S. patent application Ser. No. 14/122,231 which is a National Stage Application of PCT/US2012/034066 filed Apr. 18, 2012, which claims priority benefit of Provisional U.S. Application No. 61/476,618 filed Apr. 18, 2011. The U.S. Ser. No. 14/122,231 Application, the PCT/US2012/034066 Application, and the 61/476,618 Application are each incorporated by reference herein in their respective entireties.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2016, Bally Gaming, Inc.

TECHNICAL FIELD

Embodiments of the inventive subject matter relate generally to wagering game systems and networks that, more particularly, use an application on a mobile device for activities within a casino.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Furthermore, mobile devices, such as smartphones, personal digital assistants (PDAs), and so forth, are becoming more popular and more prevalent than ever. Mobile devices continue to become more advanced in technological capabilities. Software application sales for mobile devices are rising. Gaming enthusiasts, like many others, are using mobile devices more often in their personal lives. Therefore wagering game manufacturers, providers, casinos, and the like, are interested in ways to adapt use of mobile devices to the gaming industry.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example embodiments while the third section describes example operations performed by some embodiments. The fourth section describes additional example embodiments while the fifth section describes example operating environments. The sixth section presents some general comments.

Introduction

This section provides an introduction to some embodiments.

Wagering games are expanding in popularity. Wagering game enthusiasts expect continuous innovations to the wagering game experience. As stated previously, wagering game companies are interested in creating and providing innovate wagering games and gaming features to the demanding public. Further, wagering game manufacturers, providers, etc., are interested in ways to adapt use of mobile devices by the public to the gaming industry.

Figure 1:
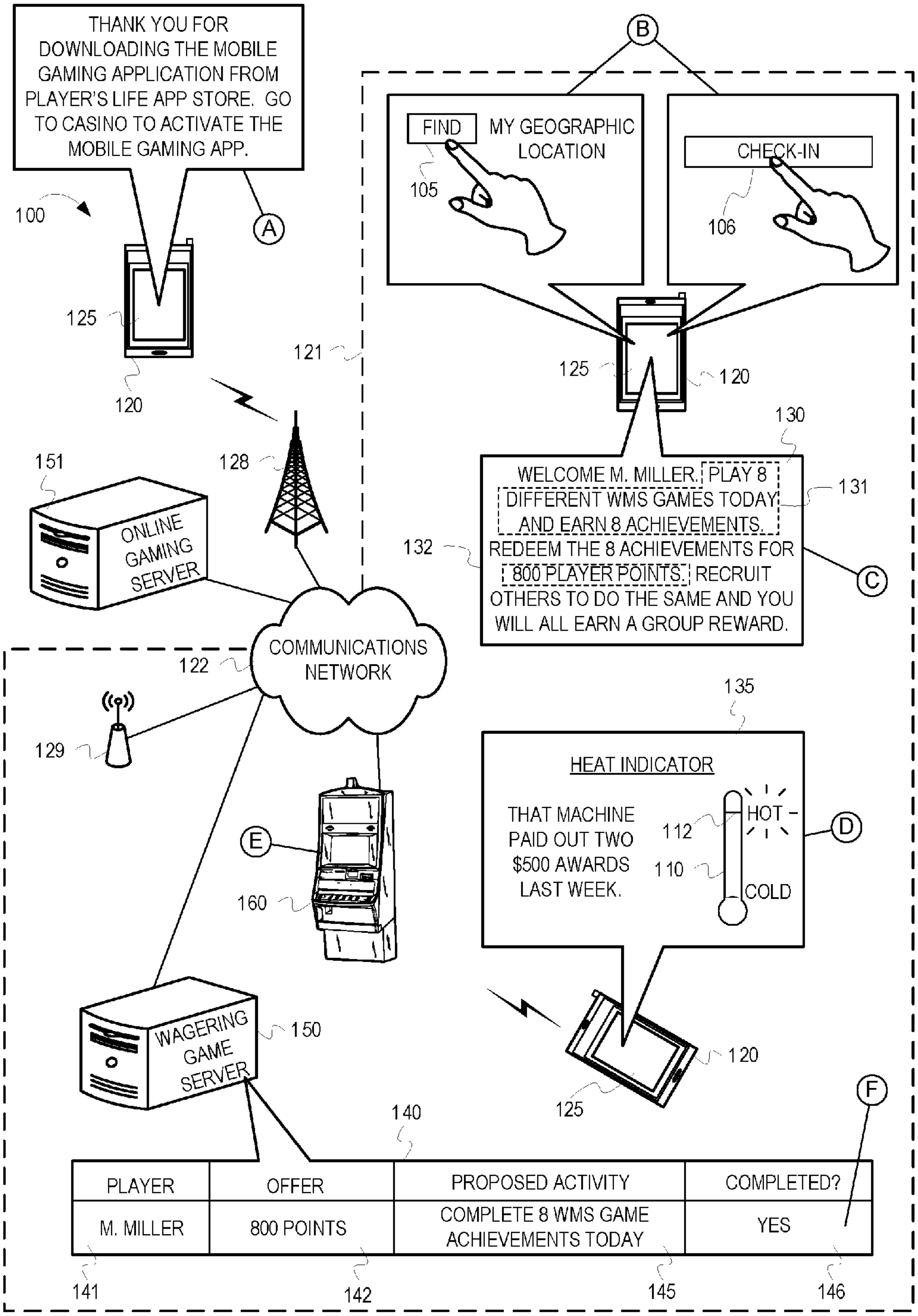
FIG. 1 is an illustration of activating and using a mobile device and application within a casino, according to some embodiments.

FIG. 1 is a conceptual diagram that illustrates an example of activating and using a mobile device and application within a casino, according to some embodiments. In FIG. 1, a mobile device 120 is connected, via a wireless communications tower 128, to a communications network 122. Also connected to the communications network 120 is an online gaming server 151, a wagering game server 150, a wagering game machine 160, and a wireless transmitter 129. The wagering game machine 160 is included within a casino 121. In some embodiments, the wagering game server 150 and the wireless transmitter 120 are also included in, or at least, connected to, a private network of gaming devices for the casino 121. In some embodiments, one or more of the elements indicated in FIG. 1, (e.g., the mobile device 120, the online gaming server 151, the wireless communications tower 128, the mobile transmitter 129, the wagering game machine 160, the wagering game server 150, the casino 121, and the communications network 122) may be referred to as a wagering game system ("system") 100. In FIG. 1, various stages (i.e., stages "A" through "F") represent use of the mobile device 120 within the system 100 for gaming purposes.

At stage "A," prior to entering the casino 121, a user can utilize the mobile device 120 to download an application 125 onto the mobile device 120. The application 125 is configured to run on the mobile device 120. The mobile device 120 may also be referred to as a handheld device, a handheld computer or simply a handheld. In some embodiments, the mobile device 120 is a pocket-sized computing device, having a display screen with touch input and/or a miniature keyboard. Some examples of the mobile device 120 may include, but are not limited to, a smartphone, a personal digital assistant, a mobile computer, a mobile internet device, a portable media player, a mobile phone, etc. In some embodiments, the mobile device 120 belongs to a casino patron, or user, and not to a casino entity or a wagering game provider (e.g., is not a mobile or portable wagering game machine). The user can carry the mobile device 120 into and out of the casino 121. In some embodiments, certain features of the application 125 become active and usable only when the mobile device 120 is within the casino 121. For instance, the application 125 presents gaming related content that is available exclusively within the casino 121.

At stage "B," after entering the casino, the mobile device 120 displays, via the application 125, a control 105 that a user can select to determine a geographic location for the mobile device 120. The mobile device 120 further displays a control 106 that a user can select to indicate that the user "checks in" to a casino 121. After the user selects the control 106, the application 125 transmits data to the wagering game server 150. The wagering game server 150 can utilize the data to verify that the mobile device 120 is located within the casino 121 (e.g., within a proximity to geographic longitude and latitude coordinates for the casino, within a boundary of the casino property, etc.). In some embodiments, the mobile device 120 communicates within the casino 121 via a telecommunications account (e.g. via a mobile telephone service provided by the telecommunications account), that transmits and receives telecommunication data via use of the wireless communications tower 128. In some embodiments, if wireless service via the wireless communications tower 128 is directly blocked or unavailable while the mobile device 120 is within the casino 121, the mobile transmitter 129 can convey telecommunication messages from and to the mobile device 120 via a casino network. Further, the mobile transmitter 129 can communicate wireless signals into, and out of, the casino 121 (e.g., sends, or receives, wireless signals to, or from, the wireless communications tower 128).

At stage "C," after the wagering game server 150 verifies that the mobile device 120 is within the casino 121, the wagering game server 150 can communicate with the application 125 on the mobile device 120 and present an offer 130 that indicates proposed activity 131 for the user to perform or complete while within the casino 121. The proposed activity 131 may be tasks, goals, accomplishments, etc. to perform via wagering game play at the wagering game machine 160, or via other wagering devices within the casino 121. For example, the offer 130 indicates that if the user (e.g., "M. Miller) plays eight different types of games from a single wagering game provider and earns eight separate achievements from the eight separate wagering games, the user can redeem the eight achievements for a certain award 132, such as a specific number of player points (e.g., 800 player points). In some embodiments, the offer 130 can propose activities that recruit other players within the casino 121, for which the wagering game server 150 can provide additional awards.

Furthermore, at stage "D," as the mobile device 120 moves around the casino 121, the application 125 can provide content that is related to gaming. For example, the mobile device 120 can present a heat indicator 135, which represents a degree of achievements or accomplishments that wagering devices within the casino 121 have experienced within a time period. The application 125 on the mobile device 120 detects a location and orientation of the mobile device 120 within the casino 121, such as the orientation of the mobile device 120 as it is pointed in the direction of the wagering game machine 160. When the mobile device 120 is pointed at the wagering game machine 160, the heat indicator 135 indicates a degree of payouts on the wagering game machine 160, or certain types of accomplishments that the wagering game machine 160 has experienced via game play, within the time period. For example, the heat indicator 135 shows a meter 110. A marker 112 on the meter 110 indicates a degree of hotness (i.e., a high degree of gaming payouts and/or accomplishments per a given time period) or a degree of coldness (i.e., a low degree of gaming payouts and/or accomplishments per a given time period) of the wagering game machine 160. During the specific time period of one week, for instance, the heat indicator 135 shows that the wagering game machine 160 paid out multiple awards over a specific dollar amount (e.g., over $500). In some embodiments, the heat indicator 135 may change color between a range of colors (e.g., from red to blue), make different sounds, etc. In some embodiments, the application 125 can show hotness of the casino 121 over other casinos while the mobile device 120 is outside of the casino 121. The system 100 can provide specific awards when the mobile device 120 is in the casino 121 and when the casino 121 is indicated as being hot.

Further, at stage "E," a user (e.g., M. Miller) associated with the mobile device 120 logs in to the wagering game machine 160 and begins playing wagering games and performing other wagering activity specifically to accomplish the proposed activity 131 that was indicated previously within the offer 130. The wagering game machine 160 can detect the location of the mobile device 120 in proximity to the wagering game machine 160. As the proposed activity 131 is performed during a wagering game session the wagering game server 150, or the wagering game machine 160, whichever is presenting or tracking wagering game content, can communicate with the application 125 on the mobile device 120, and can indicate via the application 125 the accomplishments of the proposed activity 131 that were performed by wagering game play at the wagering game machine 160. For example the wagering game server 150 tracks, via a record or report 140, that a player (e.g. M. Miller) has been offered the award 132 (e.g., the 800 player points) to perform the proposed activity 131 (e.g., to attain eight specific game achievements in a day). The report 140 indicates a first data value 141 that indicates the player, a second data value 142 that indicates the offer 130, a third data value 145 that indicates the proposed activity 131, and a fourth data value 146 that indicates whether the proposed activity 131 was completed.

At stage "F," after the player completes the proposed activity 131 the wagering game server 150 indicates, via the fourth data value 146, that the proposed activity 131 is completed. Then, the wagering game server 150 awards the award 132, indicated via the second data value 142, to a player account associated with the player indicated via the first data value 141.

Furthermore, the player can perform the proposed activity 131 at various locations within the casino 121, such as at the wagering game machine 160 or at other wagering game machines not depicted in FIG. 1. The application 125 can indicate the completion of various parts, or portions, of the proposed activity 131 as the player moves around in the casino 121. For example, FIG. 2 below shows an embodiment where the application 125 tracks and presents the progress of the proposed activity 131 as it is completed within the casino 121.

Further, some embodiments of the inventive subject matter describe examples of using mobile-device applications to present content via an online casino, a wagering game website, a wagering network, etc. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Embodiments

This section describes some example embodiments.

Using a Mobile Device Application within a Casino

Figure 2:
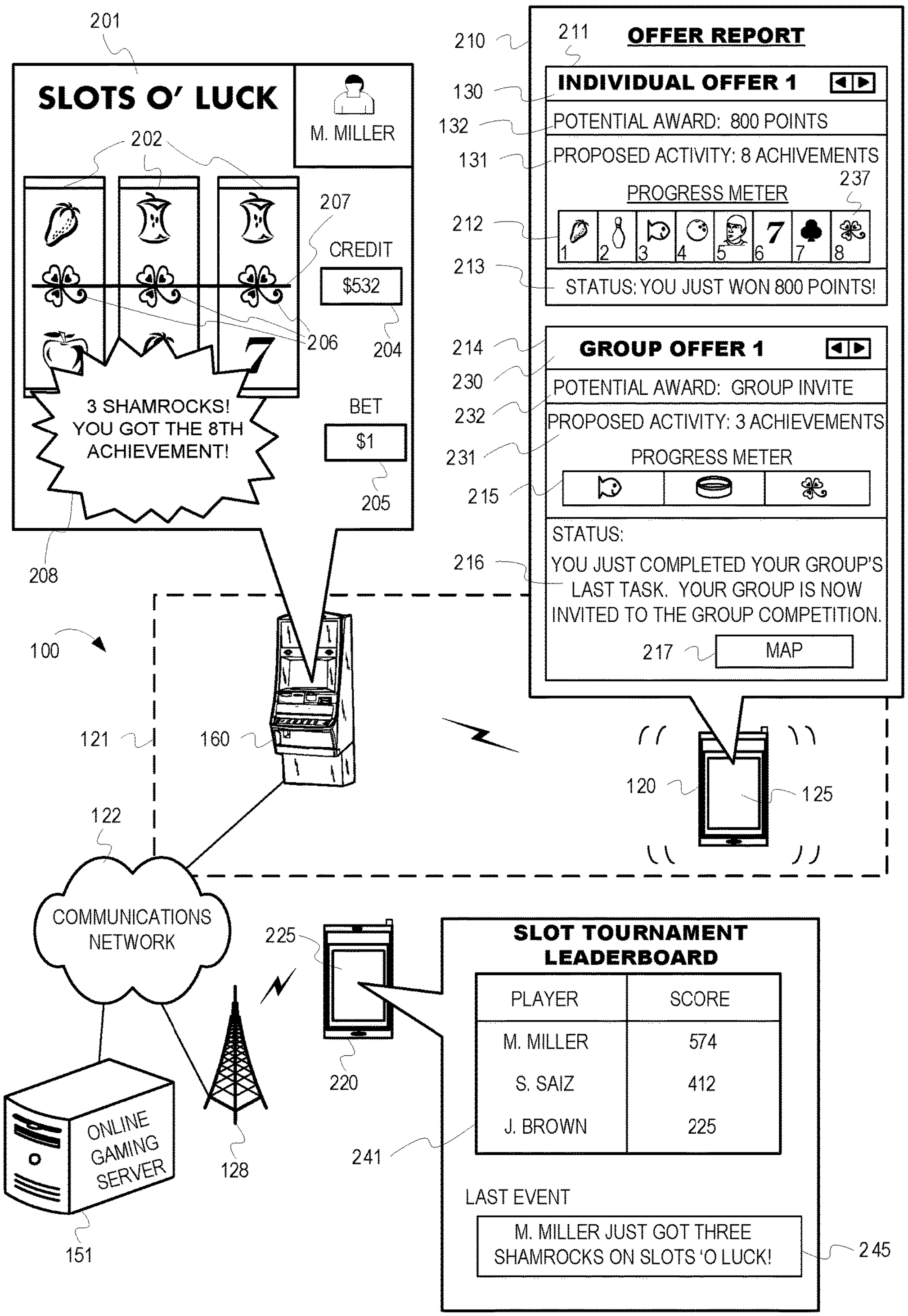
FIG. 2 is an illustration of using a mobile device within a casino, according to some embodiments.

FIG. 2 is a conceptual diagram that illustrates an example of using a mobile device within a casino, according to some embodiments. In the FIG. 2 the mobile device 120 described previously in FIG. 1 is within the casino 121 and is connected or interfaced with the wagering game machine 160 during a wagering game session. During the wagering game session the wagering game machine 160 presents a wagering game application 201 (e.g., the "Slots 0' Luck" wagering game). The wagering game application 201 presents wagering game elements on reels 202, a credit meter 204, and a bet meter 205. During the wagering game session a wagering game player utilizes controls on the wagering game machine 160 to spin the reels 202. During the wagering game, a gaming event occurs, such as three elements in a row on the reels 202 (e.g. three shamrocks 206 in a row aligned along a payline 207). The gaming event is part of the proposed activity 131 associated with the offer 130. The wagering game machine 160, or the wagering game application 201, detects the occurrence of the gaming event and presents a message 208 that specifies that the gaming event occurred and that the gaming event equates to a final accomplishment (e.g., the last of the 8 accomplishments) specified via the proposed activity 131. The mobile device 120 vibrates, or performs some other indicating action, to specify that the proposed activity 131 was completed. The mobile device 120 can also present an offer report 210 that tracks progress of offers and activity performed within the casino 121. For example, the offer report 210 presents an individual offers section 211 that presents a progress meter 212 that indicates a progressive attainment of the proposed activity 131. In other words, as the portions, or events, indicated in the proposed activity 131 are accomplished, the application 125 presents representative metrics (e.g., the individual graphics within the progress meter 212), to specify accomplishment of the events. When the wagering game application 201 experienced the final gaming event (i.e., the three shamrocks 206, which is the final proposed achievement from the proposed activity 131) the progress meter 212 indicates a final, individual metric 237 (e.g., a shamrock graphic, which represents the attainment of the three shamrocks 206 along the payline 207). The offer report 210 then presents a message 213 that indicates that the player won the award 132 by accomplishing all of the achievements that comprise the proposed activity 131.

The offer report 210 can also track proposed activity 231 for a group offer 230 in a group offer section 214, which includes a second progress meter 215. Some, or all, of the proposed activity 131 can also be used as progress towards a group goal or proposed activity 231. For example, the event of the three shamrocks 206 may be used as an event for the offer 130 and for the offer 230. In the example shown in FIG. 2, the event of the three shamrocks 206 also happens to be a final achievement required for both the offer 130 and the offer 230. Multiple players can cooperate or participate in the proposed activity 231 for the group offer 230. The player who owns the mobile device 120 can be a member of that group. The combined cooperative efforts of the group members advance progress toward a group award 232. In another embodiment, each player may have to perform the same activities or perform separate activities and as soon as all of the players perform the same activities or separate activities then each member of the group can receive a portion of the group award 232. As soon as the proposed activity 231 is completed, the offer report 210 can present a message 216 that notifies the user of the completion of the proposed activity 231. The group award 232 can be one of many things such as an object, a service, an invitation, etc. The application 125 can also present a map activated by the control 217 that directs the player toward a group event such as a group competition indicated by the group award 232.

Concurrently, as the player performs the proposed activity 131 or the proposed activity 231 via the wagering game machine 160, the wagering game server 150 can communicate game play data (e.g., individual spin data) and accomplishments, such as the achievement of obtaining the three shamrocks 206, via the communications network 122, to the online gaming server 151. The system 100 can further include an additional mobile device 220 that runs an additional application 225 similar to the application 125. The online gaming server 151 can transmit data via the wireless communications tower 128 to the second mobile device 220 owned by another user (e.g. S. Saiz). The mobile device 220 can present a leaderboard 241 via the application 220. The leaderboard 241 indicates progress made in a secondary game, such as a persistent state game, a slot tournament, etc., that is tracked outside of the casino 121 and presented via the application 225. The application 225 also presents a message 245 that indicates that the user within the casino 121 had attained the accomplishment (e.g., the three shamrocks 206 in the row) and the message 245 specifies that accomplishment as being a most recent event that occurred for the secondary game (e.g. for the slot tournament tracked by the application 225).

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
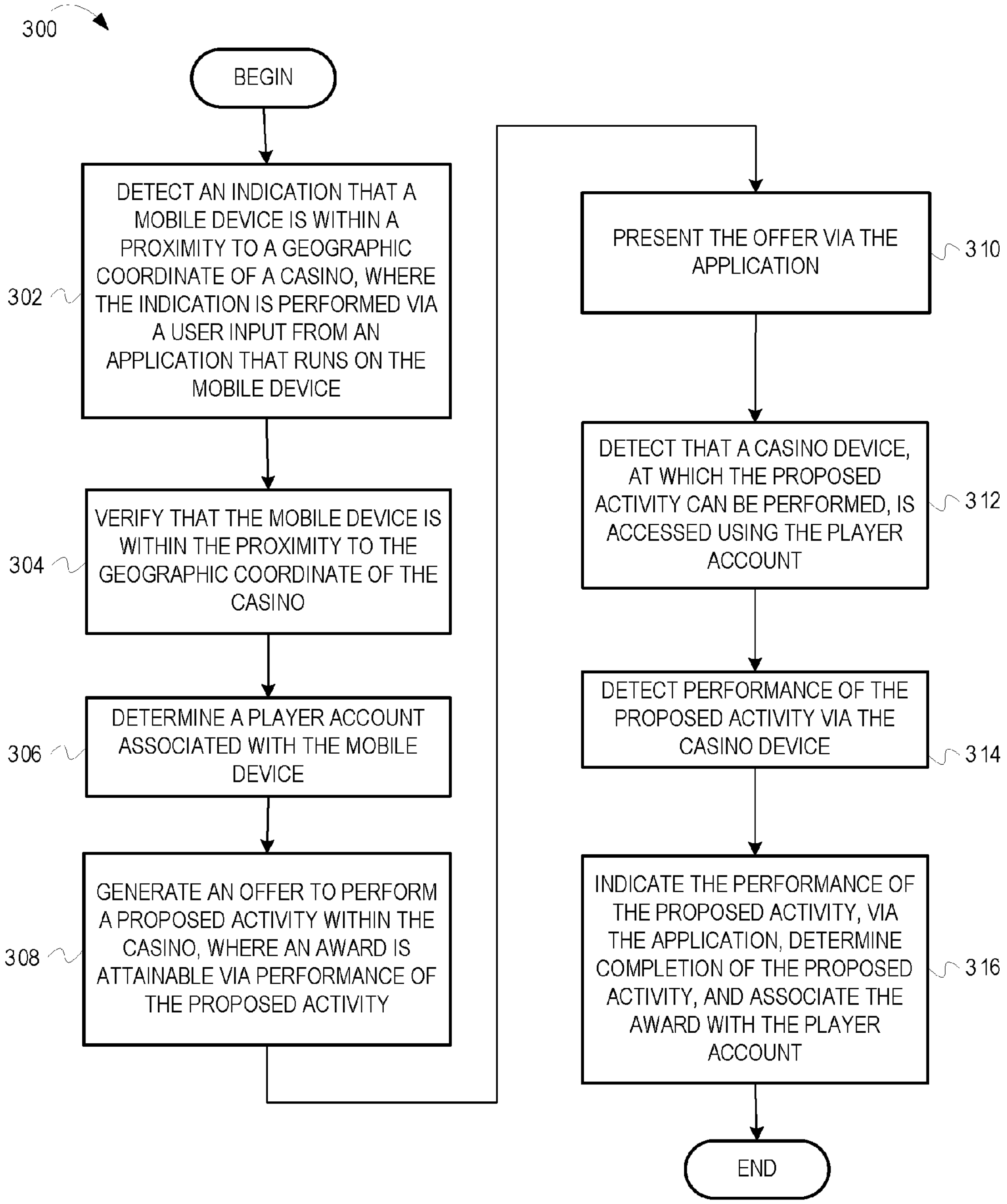
FIG. 3 is a flow diagram 300 illustrating using a mobile device application within a casino, according to some embodiments.

FIG. 3 is a flow diagram ("flow") 300 illustrating using a mobile device application within a casino, according to some embodiments. In FIG. 3, the flow 300 begins at processing block 302, where a wagering game system ("system") detects an indication that a mobile device is within a proximity to a geographic coordinate of a casino, where the indication is performed via a user input from an application that runs on the mobile device. If a user, or player, does not have the mobile application, the system can broadcast a message to the player via a communication feature of the player's mobile device (e.g., via an email program on the mobile device, via a web browser on the mobile device, etc.). For instance, the player can navigate via a wireless application protocol (WAP) web browser to an online application store and download the application. The system can require the player to create an online account via the application. The creation of the online account via the application can register and associate a unique identifier for the mobile device (e.g., a serial number, a telephone number, etc.) with identifying information for the player (e.g., a name, a social security number, an account identifier). The system can then, at some point, associate the mobile device with a wagering game player account. For example, the application can register the online account with a gaming server (e.g., an adaptive gaming server) that associates the online account with a wagering game player account, tracks events that occur via one of the accounts, and uses the events to unlock content accessible via the other account. The system can associate the player account with the mobile device prior to the mobile device being brought to the casino. In another example, the system can register a mobile device via a two factor authentication scheme.

The flow 300 continues at processing block 304, where the system verifies that the mobile device is within the proximity to the geographic coordinate of the casino. In some embodiments, the system can detect when the player takes the mobile device into a casino, such as in FIG. 1 where the wagering game server 150 detects that the mobile device 220 is within the casino 121 (e.g., within a boundary associated with a casino floor, within a specific distance to the casino floor perimeter, etc.). The system can utilize a global positioning service (GPS) to detect the location of the mobile device and compare GPS coordinates of the mobile device to GPS coordinates for the casino boundaries and/or surrounding property associated with the casino.

The flow 300 continues at processing block 306, where the system determines a player account associated with the mobile device. For instance, the system determines a unique identifier associated with the mobile device (e.g., serial number, telephone number, etc.) and compares it to an equivalent entry in a player account. In some embodiments, the system had previously associated the mobile device with a player account. In other embodiments, the system can determine the player account is associated with the mobile device after the player arrives at the casino. For example as described above for processing block 302, the system may have identifying information for the player stored in a server because the player had previously downloaded the application onto the mobile device and registered identifying information for the mobile device with the player's identifying information. The player may check-in at a kiosk at the casino and provide a player account identifier (e.g., swipe a player tracking card and/or provide a password). The player account identifier is associated with a wagering game player account that has similar identifying information for the player. In one embodiment, the mobile device can broadcast identifying information about the player and/or identifying information about the mobile device. In other embodiments, the system can search through a listing of online accounts for the player's identifying information. The system can then match the identifying information provided via the mobile device, application, and/or online account with the similar identifying information associated with the wagering game player account (e.g., when the mobile device is determined to be at the geographic location for the casino, when the mobile device is determined to be within a boundary of the casino, etc.). The system, thus, can register the identifying information for the mobile device with and the wagering game player account. The system can further link a login of the online account, via the application, to subsequent logins of the wagering game player account during wagering game sessions at the casino, and/or to communication devices associated with the casino network. Thus, the system can communicate to the player, via the application on the mobile device, information about activity performed via the wagering game player account at the casino.

The flow 300 continues at processing block 308, where the system generates an offer to perform a proposed activity within the casino, where an award is attainable via performance of proposed activity within the casino. The system can generate various types of offers, with various types of proposed activity and potential awards.

The following list includes only a few examples of proposed activity to present via an offer:

- In some embodiments, the system can present an offer that requests a user to play any number of wagering games, or different types of wagering games, within a certain amount of time.
- In some embodiments, the system can present an offer that requests a user to play a wagering game before one or more other types of wagering games or to play specific wagering games within a specific order.

In some embodiments, the system can present an offer that requests a user to visit one or more specific devices within a casino, such as a specific kiosk, a specific electronic gaming table, etc.

In some embodiments, the system can present an offer that requests a user to perform specific non-wagering activity within the casino, such as order a drink, view an advertisement, find a specific person, fill out a survey, etc.

In some embodiments, the system can present an offer that requests a user to be the first of a group of individuals to accomplish an activity.

In some embodiments, the system can present an offer that requests a user to participate in a scavenger hunt.

The following list includes a few examples of awards to present via an offer:

In some embodiments, the system can award a specific type of wagering game bonus round.

In some embodiments, the system can unlock content or functionality of wagering games, of wagering game machines, and of the application on the mobile device while within the casino. In some embodiments, the system can further unlock assets that can be used for an external gaming venue, such as a gaming website, a social network, etc.

In some embodiments, the system can present games on a first-come, first-serve basis.

In some embodiments, the system can provide a specific local area progressive (LAP) to individuals within the casino whose mobile devices include the application.

In some embodiments, the system can award customer relationship awards, such as bonus miles, loyalty points, etc.

In some embodiments, the system can award tickets for events (e.g., shows) at the casino.

In some embodiments, the system can provide coupons to play a "for-fun" or "non-wagering" version of a wagering game on the mobile device.

In some embodiments, the system can award free wireless connectivity to the internet (e.g., free Wi-Fi) for the mobile device.

In some embodiments, the system can offer awards as roles and badges (e.g., mayor, squire, duke, etc.) based on player activity and use of the application (i.e., how often, where, etc. the user checks in via the mobile device application). In some embodiments, the system can provide awards to the player if they have specific roles/badges or can get the player closer to their role/badge when they check-in at the casino.

In some embodiments, the system can offer audio and visual playlists, and other entertainment content, that are delivered to the mobile device for playback on the application after check-in at the casino, but that are only available while at the casino.

The flow 300 continues at processing block 310, where the system presents the offer via the application. The presentation of the offer via the application can specify the award and the proposed activity to perform. In some embodiments, the system can also detect acceptance of the offer by the player (e.g., from player input via the application). In some embodiments, if the player does not like the offer, the player can request another offer, or the system can automatically present another, and continue to present offers until the player accepts an offer via the application or until the player indicates to stop presenting offer. In some embodiments, the system can detect player preferences related to offers, awards, proposed activities, etc. In some embodiments, the system can analyze past player history and generate, via the analyzing, offers that a player is most likely to accept. In some embodiments, the system can pre-transmit offers before a player comes to a casino in anticipation of the player entering the casino. The system can determine the offers that were pre-transmitted and re-present them via the application for acceptance when the mobile device is verified to be within the casino.

The flow 300 continues at processing block 312, where the system detects that a casino device, at which the proposed activity can be performed, is accessed using the player account. In some embodiments, the system detects that a player accesses a wagering game machine, a kiosk, an electronic gaming table (e-table), or other casino device that detects a unique identifier from a player tracking card (e.g., via swipe of a magnetic strip on a player tracking card, via radio frequency identification, or RFID, detection, etc.). After the player signs in at the casino device, such as at a wagering game machine, the system can transmit sign-in, or login, information to a backend server associated with a separate account (e.g., a social networking account) associated with the application on the mobile device. For instance, the separate account may be a user account of an online social network, an online gaming venue, etc. from which the application was attained. The backend server knows of the relationship between the player account and the separate account and associates or links them so that the application on the phone can receive information directly about activities performed via the player account while within the casino. In some embodiments, the system can detect that the mobile device is near a wagering game machine, and/or interfaced with the wagering game machine, by utilizing near-field location technologies and/or other means (e.g., scan a barcode on the phone, take a picture of the wagering game machine, etc.). In some embodiments, the application can dynamically generate a barcode (e.g. generate a two dimensional barcode) to present on a display (e.g., a liquid crystal display) of the mobile device), which the player can scan at the casino device.

The flow 300 continues at processing block 314, where the system detects performance of the proposed activity via the casino device. For example, the system detects accomplishment of a specific gaming event, such as a specific reel-stop combination, a specific hand at cards, a specific score, attainment of a specific game level, achievement of a gaming asset, etc. In other embodiments, the system detects performance of non-gaming activity, such as viewing of an advertisement, paying for a specific item or service, utilizing a casino service, etc.

The flow 300 continues at processing block 316, where the system indicates the performance of the proposed activity, determines completion of the proposed activity, and associates the award with the player account. For instance the application on the mobile device can receive updates of achievements and events that occurred during the wagering game play. In some embodiments, the mobile device can receive wireless signals from the wagering game machine regarding the achievements. In other embodiments, the wagering game machine can store updates to the player account, which is linked, or registered with, the mobile device via a unique identifier of the mobile device. The system can then transmit information to the application via the link between the player account and the account registered with the application (if the accounts are different, or separate, as described above in the description associated with processing block 312). The system can transfer the information via wireless telephone signals, via Wi-Fi signals, via internal casino network signals, via email, via text message, etc., directly to the mobile device. Thus, when the player steps away from one casino device, the application on the mobile device indicates an update of progress toward the completion of the proposed activity, including any awards attained via the completion of the proposed activity, and/or awards that relate to the offer (e.g., to show updated points, to show achievements accomplished so far in the casino, to show completion of the proposed activity, etc.).

Figure 4:
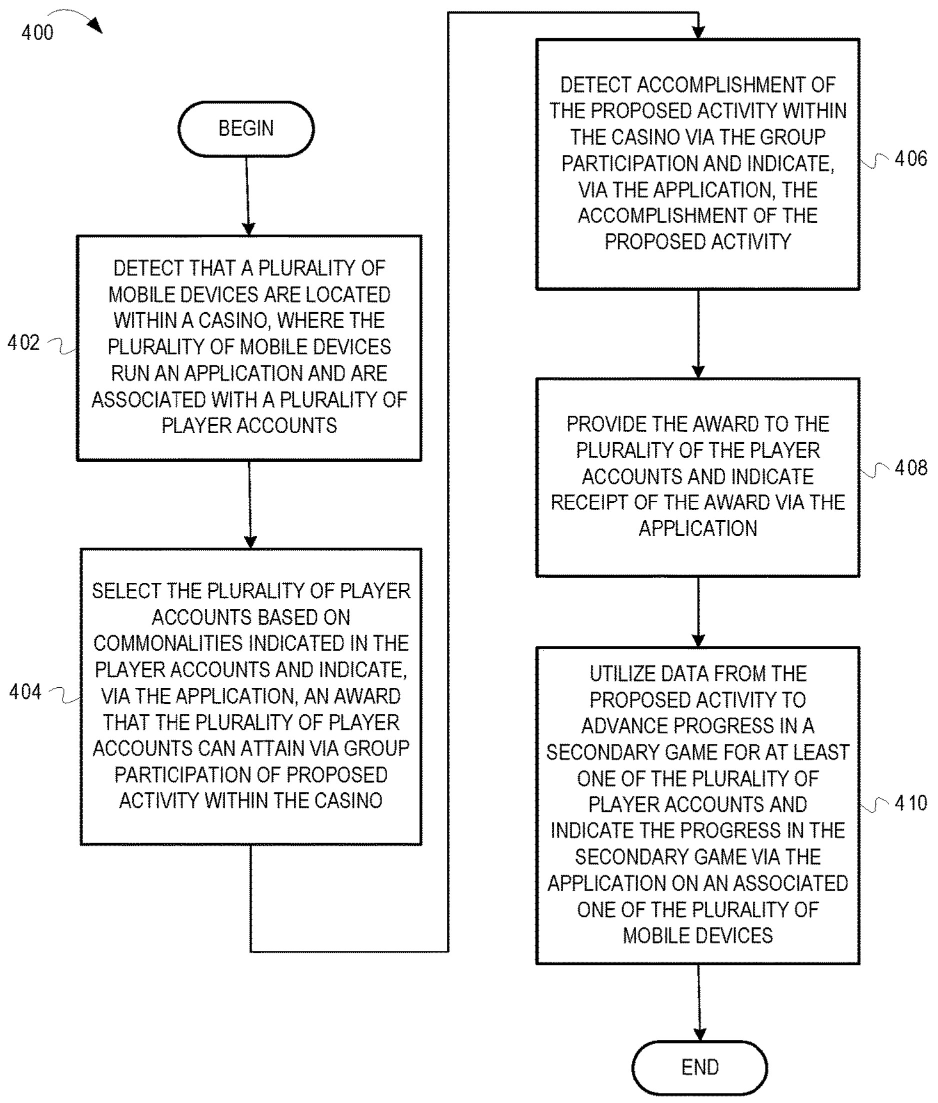
FIG. 4 is a flow diagram 400 illustrating using a mobile device application within a casino, according to some embodiments.

FIG. 4 is a flow diagram ("flow") 400 illustrating using a mobile device application within a casino, according to some embodiments. In FIG. 4, the flow 400 begins at processing block 402, where a wagering game system ("system") detects that a plurality of mobile devices are located within a casino, where the plurality of mobile devices run an application and are associated with a plurality of player accounts. The application is similar to the application 125 on the mobile device 120 in FIG. 1. Multiple mobile devices, however, would run the same application. Each of the mobile devices belongs to a separate player.

The flow 400 continues at processing block 404, where the system selects the plurality of player accounts based on commonalities indicated in the player accounts and indicates, via the application, an award that the plurality of player accounts can attain via group participation of proposed activity within the casino. In some embodiments, the system selects at least some players who have commonalities. For example, a player can walk around the casino and point their mobile device at other players. The system can detect that a player has pointed their mobile device at another player, with another mobile device, and can search profiles for player accounts associated with both players. If the system finds some commonalities between the profiles (e.g. commonalities between a specified number of preferences that match, such as similar tastes or history with game types, similar sporting teams, etc., commonalities between similar demographic makeup, commonalities between similar locations of residence, commonalities between vacation plans, etc.), the system can select the players to be members of a group. In some embodiments, the system can match players without one player having to initiate the matching (i.e., without a player having point a mobile device at another player). The system, thus, attempts to find groups who may be interested in the group offer, and who would be excited about participating as a group for the award associated with the group offer. In some embodiments, as soon as the system generates a specific number of matches (e.g., when enough of the group members have accepted participation in the group offer), then the system can begin tracking performance of the proposed activity by the individual group members.

The flow 400 continues at processing block 406, where the system detects accomplishment of the proposed activity within the casino via the group participation and indicates, via the application, the accomplishment of the proposed activity. For example, similarly as shown in FIG. 2, the system can present progress for the proposed activity on a monitor, or gauge, presented via the application. In some embodiments, the application can continue presenting the monitor, or gauge, even when one of the mobile devices leaves the casino, such as to keep a player informed of the group's progress while still permitting a player to leave and enter the casino without being disqualified from the group.

The flow 400 continues at processing block 408, where the system provides the award to the plurality of the player accounts and indicates receipt of the award via the application. As soon as the proposed activity for the group offer is completed, the system can provide the award to the player accounts. For example, the system can launch, or trigger, a community event at a specific location or bank, where the players can play the community event together. In some embodiments, the system can provide awards directly to the player account, such as distributing a number of points to the members of the group. In some embodiments, the system can distribute the award after completion of all proposed activity or progressively, as various portions of the proposed activity is completed. In some embodiments, the system can further distribute the award to members of the group proportional to a portion of the proposed activity that was performed by the individual group members.

The flow 400 continues at processing block 410, where the system utilizes data from the proposed activity to advance progress in a secondary game for at least one of the plurality of player accounts and indicates the progress in the secondary game via the application on an associated one of the plurality of mobile devices. For example, the system can launch a virtual tournament on the mobile devices (use the mobile device as a meta-tournament facilitator), which will track the virtual tournament (i.e., track spin by spin activity during wagering activity performed within the casino), and will store the tournament data online. Rewards can be provided outside of the casino, (e.g., via Player's Life™ or other social networking websites related to gaming). In other embodiments, the secondary game is a persistent state game associated with an online gaming venue. The persistent state game, for example, can present progress on a map, game card, score board, etc. In some embodiments, the persistent state game presents wagering game content that is unlocked inside the casino because of non-wagering game activity performed outside of the casino, and where the persistent state game presents non-wagering game content outside of the casino that was unlocked via performance of wagering game activity within the casino.

Additional Example Embodiments

According to some embodiments, a wagering game system ("system") can provide various example devices, operations, etc., to use mobile devices and applications in association with casinos. The following non-exhaustive list enumerates some possible embodiments.

Connections between mobile device applications for social interaction. In some embodiments, the system can integrate applications between mobile devices so that social contacts (e.g., friends, family, etc.) can communicate with each other. The applications on the mobile devices can include invite features that a player can utilize to recruit others, such as social contacts, to check-in and receive offers. The system can track and award recruiting and affiliated relationships between players. For example, if one player recruits a number of friends to participate in one or more offers, then the system can reward the player with a portion of the friend's awards, or a another recruiting reward. In some embodiments, the system can present a map that displays a location of mobile devices of friends within the casino. In some embodiments, the system can utilize near-field communication to create a close proximity paring of mobile devices, and or with relay devices that communicate between mobile devices. In some embodiments a wagering game machine can broadcast communications (e.g., phone calls, text messages, etc.) between a mobile device and other devices, either inside or outside of the casino, in addition to commercial wireless telecommunication services. Thus, a player can communicate with other players, via mobile device applications, whether inside or outside of the casino. In some embodiments, friends can use the mobile device application to track winnings and to split the winnings from wagering games played within a casino. In some embodiments, the system can track activity by people in the casino and unlock content on other user's mobile devices outside the casino. Also vice versa, users playing outside the casino can provide benefit to the player's gaming while in the casino. In some embodiments, the system can track a specific amount of money given to a player to play, by a user, while in the casino. The player in the casino can hold up the mobile device so that the user can see what is happening with the play of their money. The mobile device can record the game play (e.g., record a spin of a slot game via a video camera on the mobile device) and send a recording of the game play to the outside player. In some embodiments, the system can entice multiple user's to go to a casino (organize the group online), and only if all members of the group show up to the casino will the system provide an offer or award. If all group members check-in, the same reward, content, etc. is available on all group member's applications. While enticing the users prior to arriving, the system can provide a reward.

Third-party incorporation with the application on the mobile device. In some embodiments, the system can provide features for a third party (e.g., third party vendors, businesses, websites, etc.) on the application which the player can access while within the casino. For example, a specific vendor may provide a coupon via the application which the player can utilize to purchase items, redeem for gaming activity, etc. The third party can track whether a player performs something in the casino, and provide a reward via the application when the player is outside the casino (e.g., for example, a manufacturer may detect when a player orders a product by the manufacturer within casino, and the manufacturer offers a discount on that, or a similar product, to be used outside the casino). In some embodiments, the application can integrate with features and content of an online gaming venue to inform the player of specific activities to perform within the casino. Some of the specific activities can be associated with the online gaming venue (e.g., originate from an online gaming venue game, were selected via player input via the online gaming venue, have a common theme with games or other content provided at the online gaming venue, etc.). Some of the features and content can incorporate with wagering games presented in the casino. Some of the features and content can indicate when other members of the online gaming venue are performing activity within the casino (e.g., indicate other members who have hit a jackpot, a royal flush, or other gaming achievement).

Scheduling in-casino activities and devices via the mobile device application. In some embodiments, the system can utilize the application to register a player for an in-casino tournament and/or put a player on a reservation list for a specific casino feature (e.g. a reservation for a poker table, a wagering game machine, etc.) when the player checks-in. Performance of proposed activities can increase the player's chances of getting an invitation to the in-casino tournament, or to move the player up on the reservation list for the casino feature. While the player waits for the reservation of the casino feature, the system can offer a for-fun version of the casino feature (e.g., a for-fun version of a poker game, a slot game, etc.). The system can notify the player when the casino feature is available via the application.

Example Operating Environments

This section describes example operating architectures, environments, systems and networks, and presents structural aspects of some embodiments.

Wagering Game System Architecture

Figure 5:
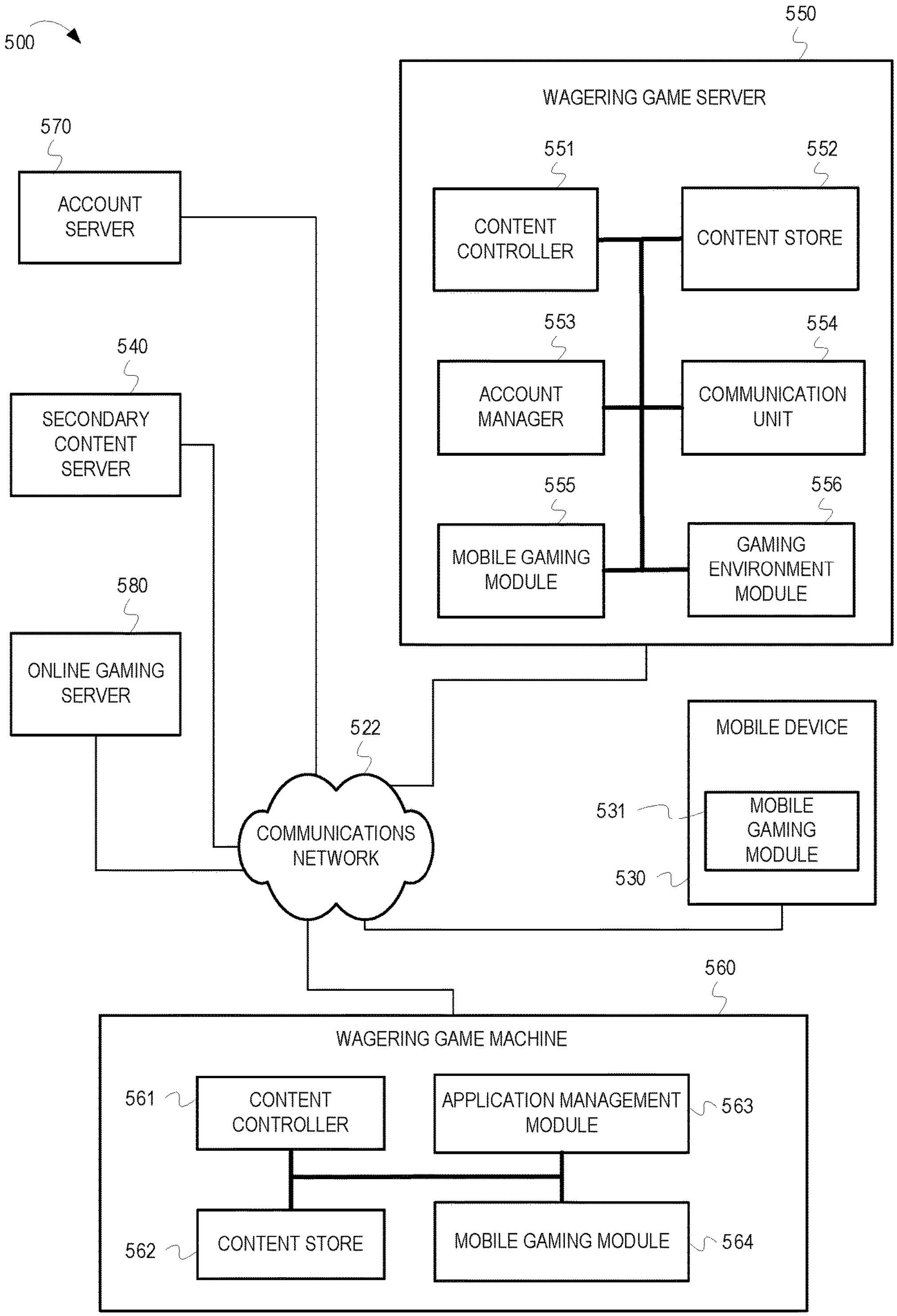
FIG. 5 is an illustration of a wagering game system architecture 500, according to some embodiments.

FIG. 5 is a conceptual diagram that illustrates an example of a wagering game system architecture 500, according to some embodiments. The wagering game system architecture 500 can include an account server 570 configured to control user related accounts accessible via wagering game networks and social networking networks. The account server 570 can store wagering game player account information, such as account settings (e.g., settings related to group games, etc., settings related to social contacts, etc.), preferences (e.g., player preferences regarding content presentable via an application of a mobile device, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 570 can contain lists of social contacts referenced by a player account. The account server 570 can also provide auditing capabilities, according to regulatory rules. The account server 570 can also track performance of players, machines, and servers.

The wagering game system architecture 500 can also include a wagering game server 550 configured to control wagering game content, provide random numbers, and communicate wagering game information, account information, and other information to and from a wagering game machine 560. The wagering game server 550 can include a content controller 551 configured to manage and control content for presentation on the wagering game machine 560. For example, the content controller 551 can generate game results (e.g., win/loss values), including win amounts, for games played on the wagering game machine 560. The content controller 551 can communicate the game results to the wagering game machine 560. The content controller 551 can also generate random numbers and provide them to the wagering game machine 560 so that the wagering game machine 560 can generate game results. The wagering game server 550 can also include a content store 552 configured to contain content to present on the wagering game machine 560. The wagering game server 550 can also include an account manager 553 configured to control information related to player accounts. For example, the account manager 553 can communicate wager amounts, game results amounts (e.g., win amounts), bonus game amounts, etc., to the account server 570. The wagering game server 550 can also include a communication unit 554 configured to communicate information to the wagering game machine 560 and to communicate with other systems, devices and networks. The wagering game server 550 can also include a mobile gaming module 555 configured to provide offers to players, presentable via an application of a mobile device, to complete proposed gaming activity within a casino in return for awards. In some embodiments, the mobile gaming module 555 is further configured to track and indicate progress (e.g., completion of the proposed gaming activity) as well as attainment of awards within the casino. In some embodiments, the mobile gaming module 555 is further configured to track group activity within a casino, including group offers and attainment of proposed group gaming activity. In some embodiments, the mobile gaming module 555 is further configured to present a variety of content related to gaming activities within a casino. In some embodiments, the mobile gaming module 555 is further configured to interface with gaming devices within a casino. In some embodiments, the mobile gaming module 555 is further configured to provide content related to gaming, via an application of the mobile device, while the mobile device is outside the casino. In some embodiments, the mobile gaming module 555 is configured to provide content to one or more mobile devices outside of a casino that is related to gaming activity (e.g., that is related to accomplishment of proposed gaming activities) within the casino. The wagering game server 550 can also include a gaming environment module 556 configured to present environmental light and sound effects in a casino environment. The gaming environment module 556 is further configured to provide content data, user data, and control information regarding gaming effects within a casino environment. For example, the gaming environment module 556 can coordinate a synchronized presentation of lighting and sound effects across a bank of wagering game machines and/or other lighting and sound producing devices within one or more areas of a casino. The gaming environment module 556 can also be configured to detect gaming events, such as events generated by the wagering game server 550 and/or the wagering game machine 560. The gaming environment module 556 can generate data for a synchronized light/sound show based on the gaming events. The gaming environment module 556 can control environmental light presentation devices within a casino. The gaming environment module 556 can provide emotive lighting presentation data, including light presentation commands on emotive lighting devices on or near wagering game machines, as well as other devices within the casino such as spotlights, overhead emotive lighting, projectors, etc. The gaming environment module 556 can be configured to determine multi-media, casino-content, including casino-wide special effects that include sound effects and light effects. The multi-media casino content can be presentable across a plurality of casino content presentation devices ("presentation devices") in a casino. The multi-media, casino-content effect can be related to a wagering game presentation or event. The wagering game presentation or event can be tied to the functionality, activity, or purpose of a wagering game. For instance, wagering game presentations can be related to attracting wagering game players to groups of wagering game machines, presenting game related outcomes across multiple wagering game machines, expressing group gaming activity across multiple wagering game machines, focusing attention on a particular person or machine in response to a gaming event, etc. The presentation devices present sound and light effects that accompany a gaming event (e.g., a jackpot celebratory effect that focuses on a wagering game machine, a lightning strike that introduces a community gaming event, and a musical chair game that reveals a community wagering game winner). The gaming environment module 556 can also be configured to determine timing control data for the multi-media effect. In some embodiments, timing control data can be stored on the wagering game server 550, or be accessible to the gaming environment module 556 via another device (e.g., a lighting controller associated with a bank of wagering game machines), to use to send lighting commands in sequential order to network addresses of presentation device on a casino network. The gaming environment module 556 can determine channels assigned with casino-content presentation devices, such as the wagering game machine 560. In some embodiments, the presentation devices can have addresses assigned to a channel. For example, the wagering game machine 560 could be on one channel, peripheral devices could be on another channel, network light presentation devices can be on other channels, etc. In some embodiments, the gaming environment module 556 can be a DMX controller connected in parallel to an emotive lighting controller on, or associated with, the wagering game machine 560. The DMX controller can also be connected in parallel to a plurality of other presentation devices (e.g., other wagering game machines, lighting presentation devices, etc.) within a casino, and can simultaneously provide DMX lighting commands to the wagering game machine 560 and to the other presentation devices. DMX can change light intensity, or other light characteristics, over time. Some embodiments of DMX controllers can update commands very quickly (e.g., 30-47 times a second) across multiple channels (e.g., 512 channels). A DMX controller can put different commands in every channel (e.g., one channel can have show "X," one channel can have show "Y," etc.). The DMX can also have a frame number within a show. Some devices can take up more than one channel (e.g., an emotive light might have three colors and may take up a channel for each color, a spotlight might have seven channels, etc.). Each device can receive 512 bytes of data from the DMX controller at any given time interval (e.g., frame). The 512 bytes of data can be divided in different ways. For example, 6 bytes may address light effect behavior, 6 bytes may include show numbers, 6 bytes may include frame numbers, 1 byte may include priority values, and so on for various light effect characteristics (e.g., intensity, color, pan, tilt, etc.). The presentation device that receives the DMX command data is programmed to interpret the lighting data in the channel. In some embodiments, the presentation devices can be DMX compliant including having a DMX input port to accept DMX commands. In some embodiments, presentation devices can convert the DMX commands to proprietary commands. In addition to the DMX protocol, other types of dedicated lighting protocols can include AMX 192, CMX, SMX, PMX, protocols included in the EIA-485 standard, etc.

The wagering game system architecture 500 can also include the wagering game machine 560 configured to present wagering games and receive and transmit information to use an application on a mobile device for activities within a casino. The wagering game machine 560 can include a content controller 561 configured to manage and control content and presentation of content on the wagering game machine 560. The wagering game machine 560 can also include a content store 562 configured to contain content to present on the wagering game machine 560. The wagering game machine 560 can also include an application management module 563 configured to manage multiple instances of gaming applications. For example, the application management module 563 can be configured to launch, load, unload and control applications and instances of applications. The application management module 563 can launch different software players (e.g., a Microsoft® Silverlight™ player, an Adobe® Flash® player, etc.) and manage, coordinate, and prioritize what the software players do. The application management module 563 can also coordinate instances of server applications in addition to local copies of applications. The application management module 563 can control window locations on a wagering game screen or display for the multiple gaming applications. In some embodiments, the application management module 563 can manage window locations on multiple displays including displays on devices associated with and/or external to the wagering game machine 560 (e.g., a top display and a bottom display on the wagering game machine 560, a peripheral device connected to the wagering game machine 560, a mobile device connected to the wagering game machine 560, etc.). The application management module 563 can manage priority or precedence of client applications that compete for the same display area. For instance, the application management module 563 can determine each client application's precedence. The precedence may be static (i.e. set only when the client application first launches or connects) or dynamic. The applications may provide precedence values to the application management module 563, which the application management module 563 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 563 of its current presentation state. The applications may provide presentation state values to the application management module 563, which the application management module 563 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 563 can be pre-configurable. The system can provide controls and interfaces for operators to control screen layouts and other presentation features for the configuring of the application management module 563. The application management module 563 can communicate with, and/or be a communication mechanism for, a base game stored on a wagering game machine. For example, the application management module 563 can communicate events from the base game such as the base game state, pay line status, bet amount status, etc. The application management module 563 can also provide events that assist and/or restrict the base game, such as providing bet amounts from secondary gaming applications, inhibiting play based on gaming event priority, etc. The application management module 563 can also communicate some (or all) financial information between the base game and other applications including amounts wagered, amounts won, base game outcomes, etc. The application management module 563 can also communicate pay table information such as possible outcomes, bonus frequency, etc. In some embodiments, the application management module 563 can control different types of applications. For example, the application management module 563 can perform rendering operations for presenting applications of varying platforms, formats, environments, programming languages, etc. For example, the application management module 563 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 563 can include a portable virtual machine capable of generating and executing code for the varying platforms, formats, environments, programming languages, etc. The application management module 563 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 560 can also include a mobile gaming module 564 configured to provide offers to players, presentable via an application of a mobile device, to complete proposed gaming activity within a casino in return for awards. In some embodiments, the mobile gaming module 564 is further configured to track and indicate progress (e.g., completion of the proposed gaming activity) as well as attainment of awards within the casino. In some embodiments, the mobile gaming module 564 is further configured to track group activity within a casino, including group offers and attainment of proposed group gaming activity. In some embodiments, the mobile gaming module 564 is further configured to present a variety of content related to gaming activities within a casino. In some embodiments, the mobile gaming module 564 is further configured to interface with gaming devices within a casino. In some embodiments, the mobile gaming module 564 is further configured to provide content related to gaming, via an application of the mobile device, while the mobile device is outside the casino. In some embodiments, the mobile gaming module 564 is configured to provide content to one or more mobile gaming devices outside of a casino that is related to gaming activity (e.g., that is related to accomplishment of proposed gaming activities) within the casino.

The wagering game system architecture 500 can also include a secondary content server 540 configured to provide content and control information for secondary games and other secondary content available on a wagering game network (e.g., secondary wagering game content, promotions content, advertising content, player tracking content, web content, etc.). The secondary content server 580 can provide "secondary" content, or content for "secondary" games presented on the wagering game machine 560. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 580 can provide and control content for community games, including networked games, social games, competitive games, or any other game that multiple players can participate in at the same time. In some embodiments, the secondary content server 580 can control and present an online website that hosts wagering games.

The secondary content server 580 can also be configured to present multiple wagering game applications on the wagering game machine 560 via a wagering game website, or other gaming-type venue accessible via the Internet. The secondary content server 580 can host an online wagering website and/or a social networking website. The secondary content server 580 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 580 can also be configured to provide content presentable via an application of a mobile device. In some embodiments, the secondary content server 580 can also host social networking accounts, provide social networking content, control social networking communications, store associated social contacts, etc. The secondary content server 580 can also provide chat functionality for a social networking website, a chat application, or any other social networking communications mechanism. In some embodiments, the secondary content server 580 can utilize player data to determine marketing promotions that may be of interest to a player account. The secondary content server 580 can also analyze player data and generate analytics for players, group players into demographics, integrate with third party marketing services and devices, etc. The secondary content server 580 can also provide player data to third parties that can use the player data for marketing. In some embodiments, the secondary content server 580 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message.

The wagering game system architecture 500 can also include an online gaming server 580 configured to control and present a website that hosts gaming related content (e.g., wagering games, non-wagering games that share common themes to wagering games, social networking content related to gaming, etc.). The online gaming server 580 can be configured to present multiple applications on the website via the Internet. The online gaming server 580 can host a social network. The online gaming server 580 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The online gaming server 580 can also be configured to provide content presentable via an application of a mobile device.

The wagering game system architecture 500 can also include a mobile device 530 configured to control mobile communications and applications. The mobile device 530 may also be referred to as a handheld device, a handheld computer or simply handheld. In some embodiments, the mobile device 530 is a pocket-sized computing device, having a display screen with touch input and/or a miniature keyboard. Some examples of the mobile device 530 may include, but are not limited to, a smartphone, a personal digital assistant, a mobile computer, a mobile internet device, a portable media player, a mobile phone, a pager, a personal navigation device, etc. In some embodiments, the mobile device 530 functions via a wireless application protocol (WAP). In some embodiments, the mobile device 530 may include integrated data capture devices like barcode readers, radio frequency identification (RFID) readers, In-cell Optical LCD readers, and smart card readers. In some embodiments the mobile device 530 is personal (i.e., belongs to a user), which the user can carry on their person. The mobile device 530 can include a mobile gaming module 531 configured to present offers to players, via an application of the mobile device 530, to complete proposed gaming activity within a casino in return for awards. In some embodiments, the mobile gaming module 531 is further configured to track and indicate progress (e.g., completion of the proposed gaming activity) as well as attainment of awards within the casino. In some embodiments, the mobile gaming module 531 is further configured to track group activity within a casino, including group offers and attainment of proposed group gaming activity. In some embodiments, the mobile gaming module 531 is further configured to present a variety of content related to gaming activities within a casino. In some embodiments, the mobile gaming module 531 is further configured to interface with gaming devices within a casino. In some embodiments, the mobile gaming module 531 is further configured to present content related to gaming, via the application of the mobile device 530, while the mobile device 530 is outside the casino.

Each component shown in the wagering game system architecture 500 is shown as a separate and distinct element connected via a communications network 522. However, some functions performed by one component could be performed by other components. For example, the wagering game server 550 can also be configured to perform functions of the application management module 563, and other network elements and/or system devices. Furthermore, the components shown may all be contained in one device, but some, or all, may be included in, or performed by, multiple devices, as in the configurations shown in FIG. 5 or other configurations not shown. For example, the account manager 553 and the communication unit 554 can be included in the wagering game machine 560 instead of, or in addition to, being a part of the wagering game server 550. Further, in some embodiments, the wagering game machine 560 can determine wagering game outcomes, generate random numbers, etc. instead of, or in addition to, the wagering game server 550.

The wagering game machines described herein (e.g., wagering game machine 560) can take any suitable form, such as floor standing models, handheld mobile wagering game machines, bar-top models, workstation-type console models, surface computing machines, etc. Further, wagering game machines can be primarily dedicated for use in conducting wagering games.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 500 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Computer System

Figure 6:
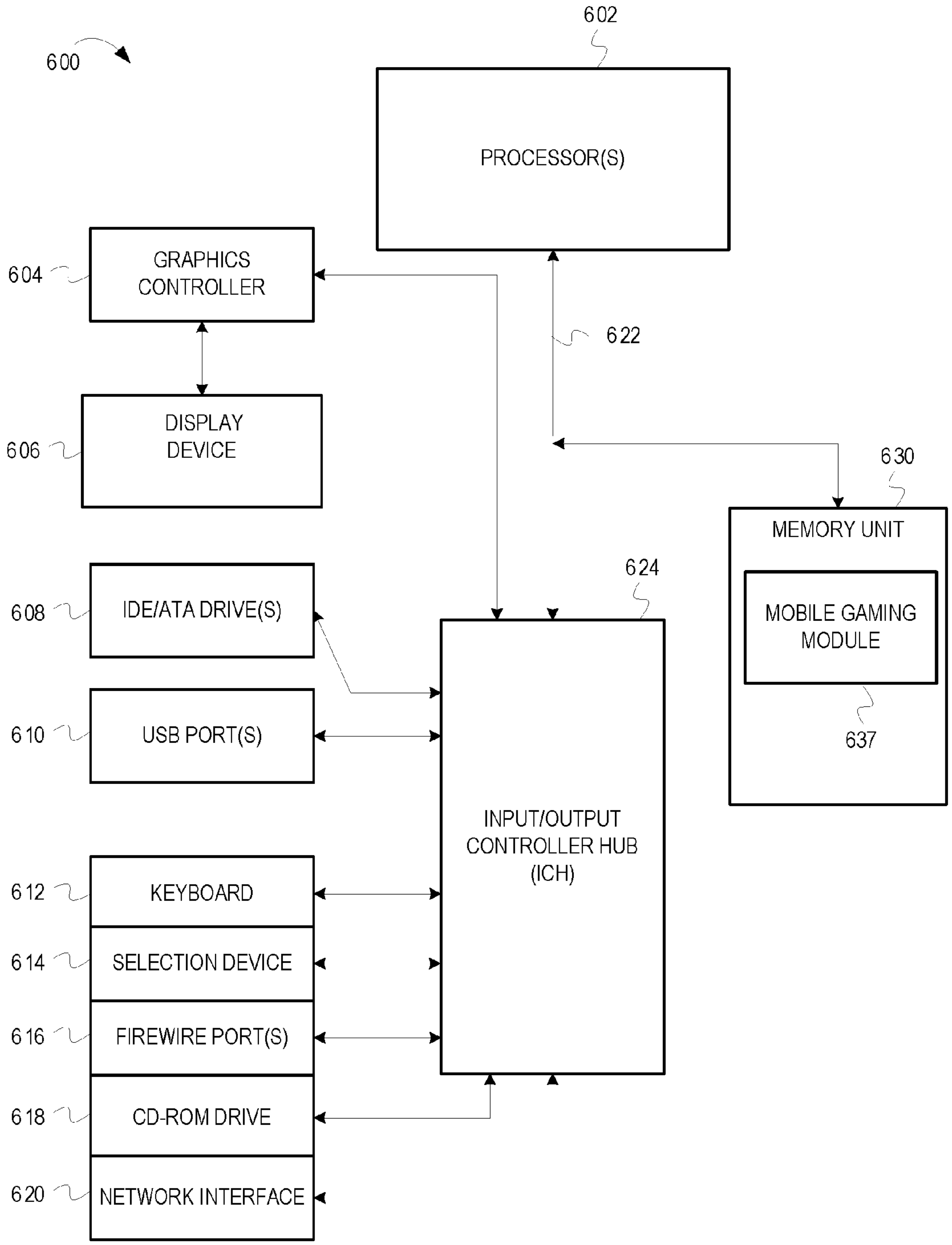
FIG. 6 is an illustration of a wagering game computer system 600, according to some embodiments.

FIG. 6 is a conceptual diagram that illustrates an example of a wagering game computer system 600, according to some embodiments. In FIG. 6, the wagering game computer system ("computer system") 600 may include a processor unit 602, a memory unit 630, a processor bus 622, and an Input/Output controller hub (ICH) 624. The processor unit 602, memory unit 630, and ICH 624 may be coupled to the processor bus 622. The processor unit 602 may comprise any suitable processor architecture. The computer system 600 may comprise one, two, three, or more processors, any of which may execute a set of instructions in accordance with some embodiments.

The memory unit 630 may also include an I/O scheduling policy unit and I/O schedulers. The memory unit 630 can store data and/or instructions, and may comprise any suitable memory, such as a dynamic random access memory (DRAM), for example. The computer system 600 may also include one or more suitable integrated drive electronics (IDE) drive(s) 608 and/or other suitable storage devices. A graphics controller 604 controls the display of information on a display device 606, according to some embodiments.

The ICH 624 provides an interface to I/O devices or peripheral components for the computer system 600. The ICH 624 may comprise any suitable interface controller to provide for any suitable communication link to the processor unit 602, memory unit 630 and/or to any suitable device or component in communication with the ICH 624. The ICH 624 can provide suitable arbitration and buffering for each interface.

For one embodiment, the ICH 624 provides an interface to the one or more IDE drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, selection device 614 (e.g., a mouse, trackball, touchpad, etc.), CD-ROM drive 618, and one or more suitable devices through one or more firewire ports 616. For one embodiment, the ICH 624 also provides a network interface 620 though which the computer system 600 can communicate with other computers and/or devices.

The computer system 600 may also include a machine-readable storage medium that stores a set of instructions (e.g., software) embodying any one, or all, of the methodologies for use an application on a mobile device for activities within a casino. Furthermore, software can reside, completely or at least partially, within the memory unit 630 and/or within the processor unit 602. The computer system 600 can also include a mobile gaming module 637. The mobile gaming module 637 can process communications, commands, or other information, to use an application on a mobile device for activities within a casino. Any component of the computer system 600 can be implemented as hardware, firmware, and/or machine-readable storage media including instructions for performing the operations described herein.

Wagering Game Machine Architecture

Figure 7:
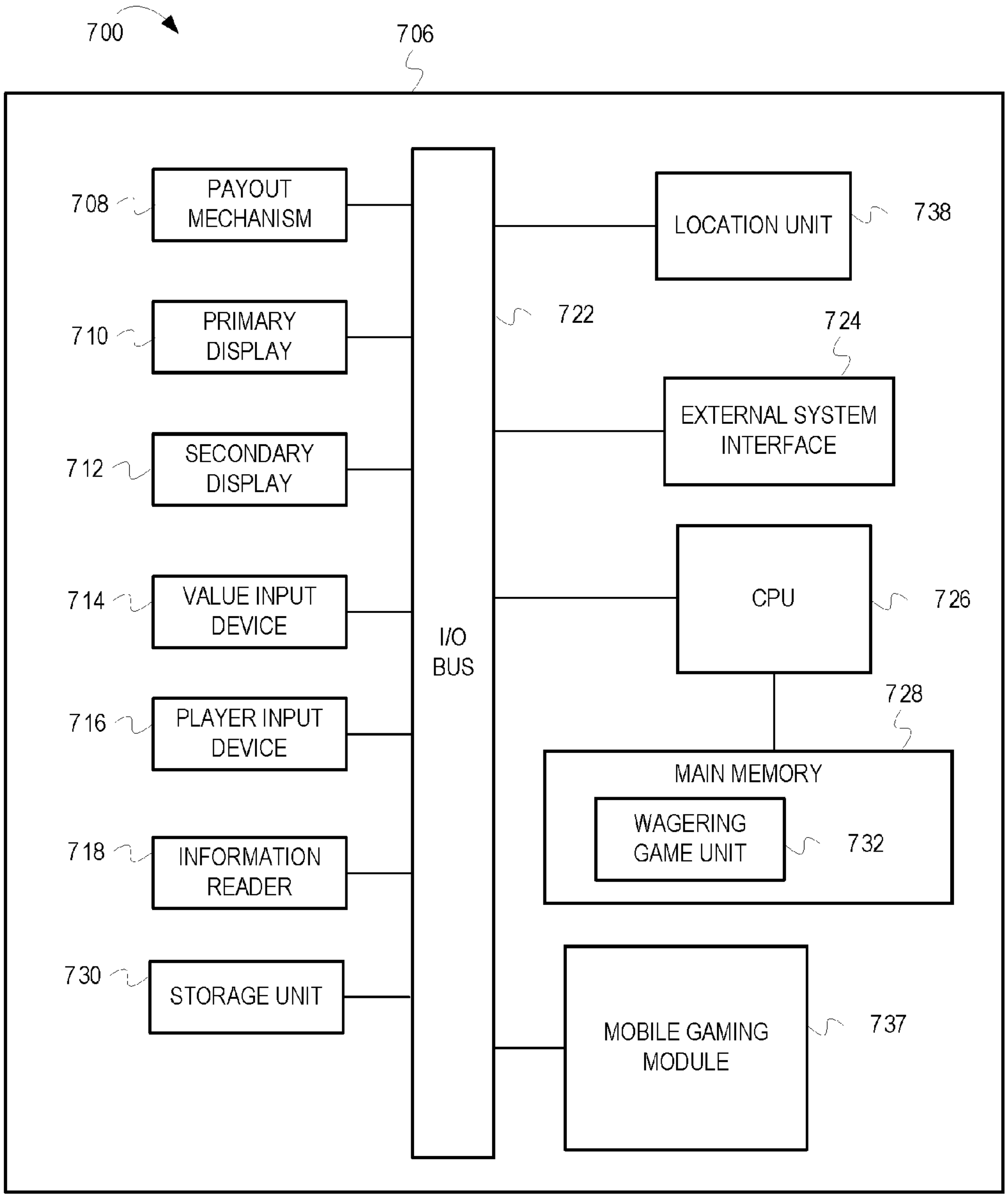
FIG. 7 is an illustration of a wagering game machine architecture 700, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732. In some embodiments, the wagering game unit 732 can present wagering games, such as video poker, video blackjack, video slots, video lottery, reel slots, etc., in whole or part.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems (e.g., wagering game networks). The external system interface 724 can include logic for exchanging information over wired and wireless networks (e.g., 802.11g transceiver, Bluetooth transceiver, Ethernet transceiver, etc.)

The I/O bus 722 is also connected to a location unit 738. The location unit 738 can create player information that indicates the wagering game machine's location/movements in a casino. In some embodiments, the location unit 738 includes a global positioning system (GPS) receiver that can determine the wagering game machine's location using GPS satellites. In other embodiments, the location unit 738 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 7, in some embodiments, the location unit 738 is not connected to the I/O bus 722.

In some embodiments, the wagering game machine 706 can include additional peripheral devices and/or more than one of each component shown in FIG. 7. For example, in some embodiments, the wagering game machine 706 can include multiple external system interfaces 724 and/or multiple CPUs 726. In some embodiments, any of the components can be integrated or subdivided.

In some embodiments, the wagering game machine 706 includes a mobile gaming module 737. The mobile gaming module 737 can process communications, commands, or other information, where the processing can use an application on a mobile device for activities within a casino.

Furthermore, any component of the wagering game machine 706 can include hardware, firmware, and/or machine-readable storage media including instructions for performing the operations described herein.

Wagering Game Machine

Figure 8:
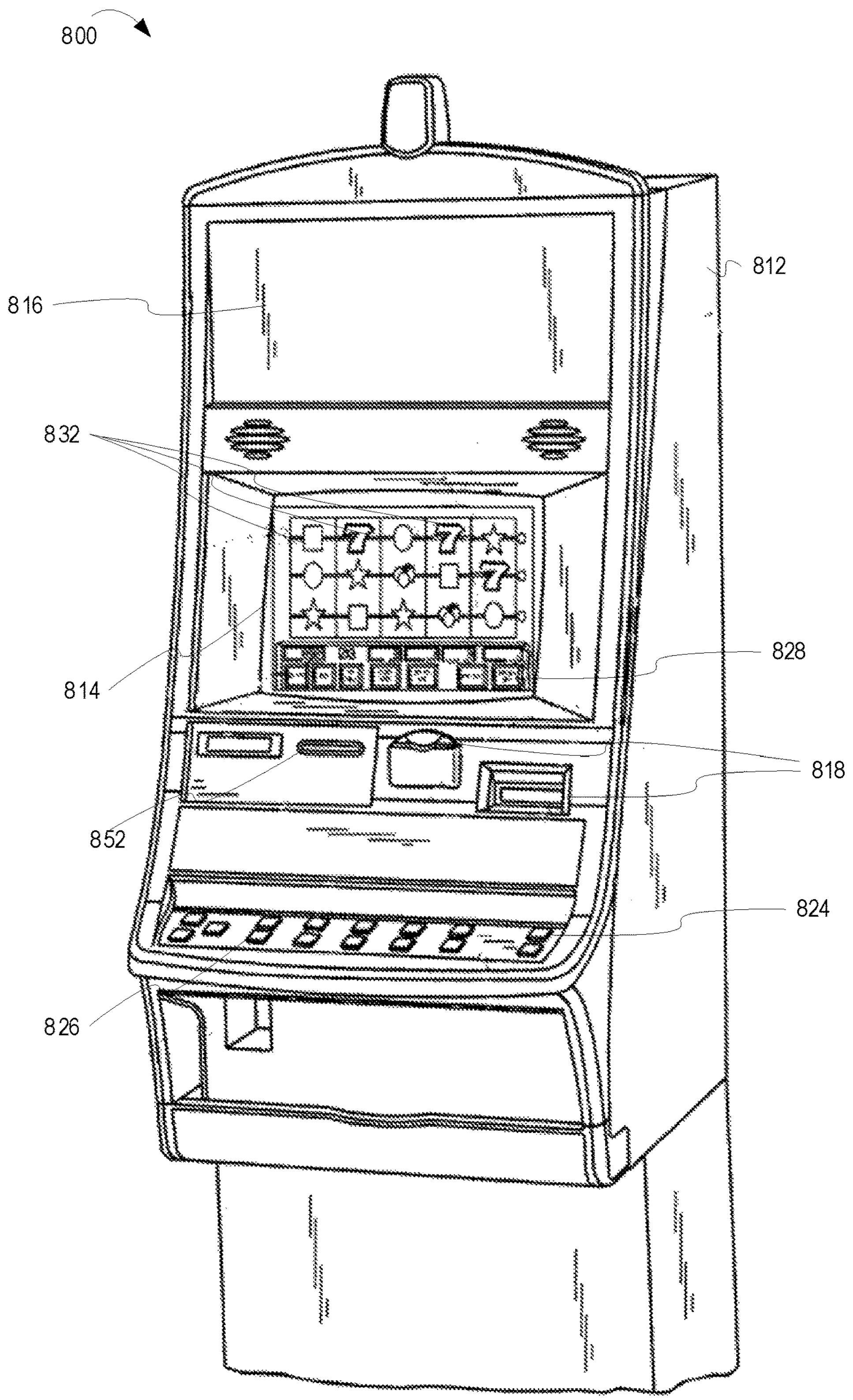
FIG. 8 is an illustration of a wagering game machine 800, according to some embodiments.

FIG. 8 is a conceptual diagram that illustrates an example of a wagering game machine 800, according to some embodiments. Referring to FIG. 8, the wagering game machine 800 can be used in gaming establishments, such as casinos. According to some embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800. In some embodiments, the wagering game machine 800 may further utilize In-cell light sensing devices.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bar top model, mobile handheld model, or workstation console model.

A player begins playing a basic wagering game by making a wager via the value input device 818. The player can initiate play by using the player input device's buttons or touch screen 828. The basic game can include arranging a plurality of symbols 832 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, In-cell light sensing, or computer readable storage medium interface. In some embodiments, the information reader 852 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system, said method comprising:

in response to detecting that a mobile device is located at a casino, transmitting to the mobile device, via a wireless communication device of the gaming system, an offer for presentation via the mobile device, wherein the offer is associated with at least one wagering game machine within the casino;

detecting, via an electronic tracking device of the at least one wagering game machine, an electronic identifier provided from the mobile device to the at least one wagering game machine; and associating, via at least one electronic processing unit of the gaming system, the offer with the at least one wagering game machine in response to detecting the electronic identifier.

2. The method of claim 1 further comprising:

prior to the mobile device being located at the casino, providing an application for the mobile device, wherein the application is configured to present the offer via an output device of the mobile device when the mobile device is at the casino.

3. The method of claim 1 further comprising detecting, via a global positioning system sensor of the mobile device, that the mobile device is located at the casino, wherein the mobile device is other than a wagering game machine.

4. The method of claim 3, wherein the detecting that the mobile device is at the casino comprises detecting that the mobile device is within a proximity to a geographic coordinate for one or more of a casino property boundary and a casino floor perimeter, and further comprising:

electronically transmitting a message for presentation via the mobile device, wherein the message indicates that the mobile device is within the proximity to the geographic coordinate; and detecting a selection of the message via user input through the mobile device to verify that the mobile device is within the proximity to the geographic coordinate.

5. The method of claim 1 further comprising:

detecting performance of an activity via the at least one wagering game machine, wherein the activity is associated with the offer; and electronically transmitting, via the wireless communication device, a message, for presentation via the mobile device, regarding one or more of performance of the activity or an award associated with performance of the activity.

6. The method of claim 5 further comprising providing the award via a payout device of the at least one wagering game machine.

7. The method of claim 1, wherein the electronic identifier is provided from the mobile device to the at least one wagering game machine when within a given proximity to the at least one wagering game machine.

8. The method of claim 1 further comprising:

determining that a wagering game player account is associated with the mobile device based on an identifier for the wagering game player account stored on the mobile device prior to the mobile device being at the casino; and customizing the offer based on one or more preferences stored in the wagering game player account.

9. One or more non-transitory, machine-readable storage media having instructions stored thereon, which when executed by a set of one or more processors of a gaming system causes the set of one or more processors to perform operations comprising:

in response to detecting that a mobile device is located at a casino, transmitting to the mobile device, via a wireless communication device of the gaming system, an offer for presentation via the mobile device, wherein the offer is associated with at least one wagering game machine within the casino;

detecting, via an electronic tracking device associated with the at least one wagering game machine, an electronic identifier provided from the mobile device in response to communication with the at least one wagering game machine; and associating, via at least one electronic processing unit of the gaming system, the offer with the at least one wagering game machine in response to detecting the electronic identifier.

10. The one or more non-transitory, machine-readable storage media of claim 9, said operations further comprising:

prior to the mobile device being located at the casino, providing an application for the mobile device, wherein the application is configured to present the offer via an output device of the mobile device when the mobile device is at the casino.

11. The one or more non-transitory, machine-readable storage media of claim 9, said operations further comprising detecting, via a global positioning system sensor of the mobile device, that the mobile device is located at the casino, wherein the mobile device is other than a wagering game machine.

12. The one or more non-transitory, machine-readable storage media of claim 11, wherein the detecting that the mobile device is at the casino comprises detecting that the mobile device is within a proximity to a geographic coordinate for one or more of a casino property boundary and a casino floor perimeter, and said operations further comprising:

electronically transmitting a message for presentation via the mobile device, wherein the message indicates that the mobile device is within the proximity to the geographic coordinate; and detecting a selection of the message via user input through the mobile device to verify that the mobile device is within the proximity to the geographic coordinate.

13. The one or more non-transitory, machine-readable storage media of claim 9, said operations further comprising:

detecting performance of an activity via the at least one wagering game machine, wherein the activity is associated with the offer; and electronically transmitting, via the wireless communication device, a message, for presentation via the mobile device, regarding one or more of performance of the activity or an award associated with performance of the activity.

14. The one or more non-transitory, machine-readable storage media of claim 9, wherein the electronic identifier is provided from the mobile device to a gaming server associated with the at least one wagering game machine when the mobile device is within a given proximity to the at least one wagering game machine.

15. A gaming system comprising:

one or more processors;

a wireless communication device; and a memory storage unit configured to instructions, which, when executed by the one or more processors, cause the gaming system to perform operations to in response to detecting that a mobile device is located at a casino, transmit to the mobile device, via the wireless communication device, an offer for presentation via the mobile device, wherein the offer is associated with at least one wagering game machine within the casino, detect, via an electronic tracking device of the at least one wagering game machine, an electronic identifier provided from the mobile device to the at least one wagering game machine, and associate the offer with the at least one wagering game machine in response to detecting the electronic identifier.

16. The gaming system of claim 15, wherein the memory storage unit is configured to store instructions, which when executed by the one or more processors, cause the gaming system to perform operations to:

prior to the mobile device being located at the casino, provide an application for the mobile device, wherein the application is configured to present the offer via an output device of the mobile device when the mobile device is at the casino.

17. The gaming system of claim 15, wherein the memory storage unit is configured to store instructions, which when executed by the one or more processors, cause the gaming system to perform operations to detect, via a global positioning system sensor of the mobile device, that the mobile device is located at the casino, wherein the mobile device is other than a wagering game machine.

18. The gaming system of claim 17, wherein the memory storage unit is configured to store instructions, which when executed by the one or more processors, cause the gaming system to perform operations to:

detect that the mobile device is within a proximity to a geographic coordinate for one or more of a casino property boundary and a casino floor perimeter;

electronically transmit a message for presentation via the mobile device, wherein the message indicates that the mobile device is within the proximity to the geographic coordinate; and detect a selection of the message via user input through the mobile device to verify that the mobile device is within the proximity to the geographic coordinate.

19. The gaming system of claim 15, wherein the memory storage unit is configured to store instructions, which when executed by the one or more processors, cause the gaming system to perform operations to:

detect performance of an activity via the at least one wagering game machine, wherein the activity is associated with the offer;

electronically transmit, via the wireless communication device, a message, for presentation via the mobile device, regarding one or more of performance of the activity or an award associated with performance of the activity; and provide the award via a payout device of the at least one wagering game machine.

20. The gaming system of claim 15, wherein the electronic identifier is provided from the mobile device to the at least one wagering game machine when within a given proximity to the at least one wagering game machine.

* * * * *